Oct. 15, 1963   A. J. BRANDEL ETAL   3,106,841
METHOD FOR MEASURING OIL ON REFINERY OIL-WATER SEPARATORS
Filed Feb. 8, 1961   2 Sheets-Sheet 1
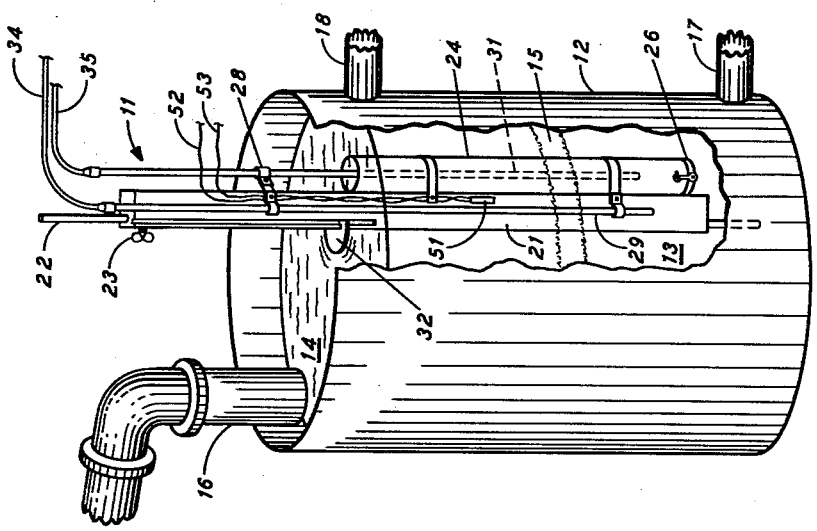
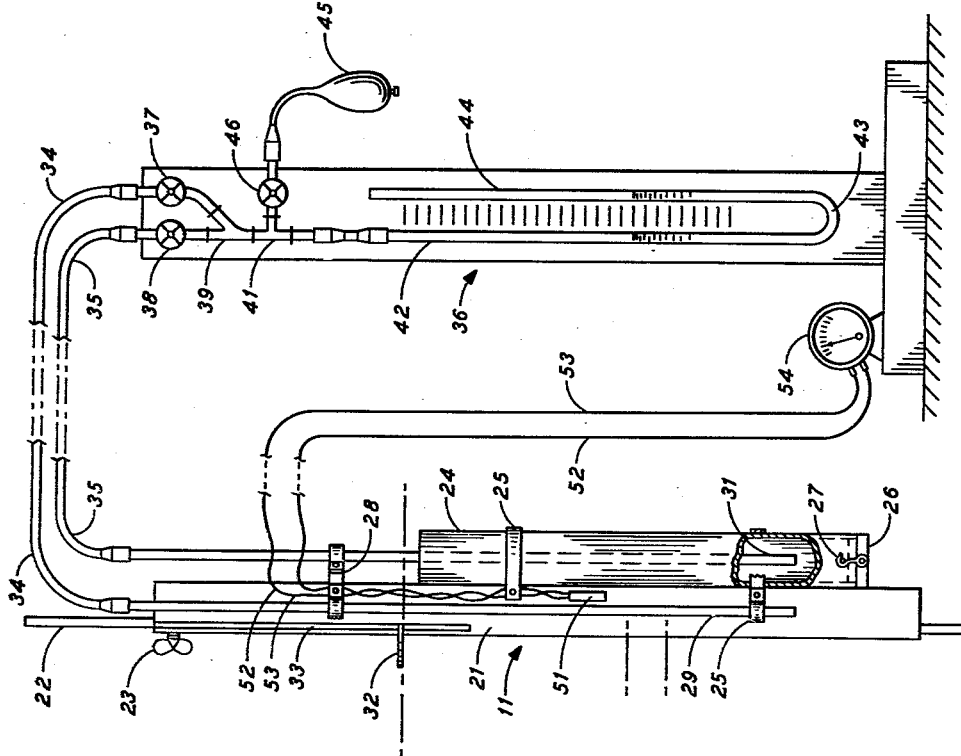
INVENTORS
ALBERT J. BRANDEL
GEORGE B. DeMAY
BY
ATTORNEYS

United States Patent Office 3,106,841
Patented Oct. 15, 1963

3,106,841
METHOD FOR MEASURING OIL ON REFINERY OIL-WATER SEPARATORS
Albert J. Brandel, Compton, and George B. De May, El Segundo, Calif., assignors to California Research Corporation, San Francisco, Calif., a corporation of Delaware
Filed Feb. 8, 1961, Ser. No. 87,951
1 Claim. (Cl. 73—302)

This invention relates to a method and apparatus for determining liquid levels and more particularly to an improved apparatus and method for operation thereof useful in ascertaining the plane of demarcation between two immiscible liquids in a tank or other vessel filled with such liquids. The invention has particular application in the measurement of the oil layer on top of a water layer in an oil-water separator.

The measurement of the depth of the oil layer in an oil-water separator has commonly been done by a thief-sampling method wherein a tube is inserted into the separator to sample a cross section of the contents. The depth of oil in the sampler is determined by visual observation. The thief-sampling method is satisfactory where a clean break occurs between the oil and water layer in the separator. However, in many separators an emulsion layer occurs between the oil and water layers making a precise determination of the oil-water interface difficult. The determination of oil content in the thief-sampling method further requires that there be sufficient illumination to permit observation of the material within the sampler.

The present invention provides an improved method and apparatus for measuring the depth of the oil layer including oil present as an emulsion within an oil-water separator by measuring the specific gravities of a predetermined depth of oil layer and of the same depth of a separated column of oil and water combined. The specific gravities or densities of the oil layer and the oil-water combination are determined by measuring the air pressure required to bubble air out of a tube immersed to the predetermined depth in the two materials.

The object of the present invention is an improved apparatus and method for using the apparatus in the determination of the depth of a first fluid layer floating on top of a second fluid layer within a vessel wherein said first and second fluids are permitted to separate.

Further objects and features of the invention will be readily apparent to those skilled in the art from the specification and appended drawings illustrating a certain preferred embodiment in which:

FIG. 1 is a perspective view partially cut away to illustrate the fluid level measurement probe of the present invention in position in a separator.

FIG. 2 is an elevational view of the probe and its associated manometer.

Figure 3:
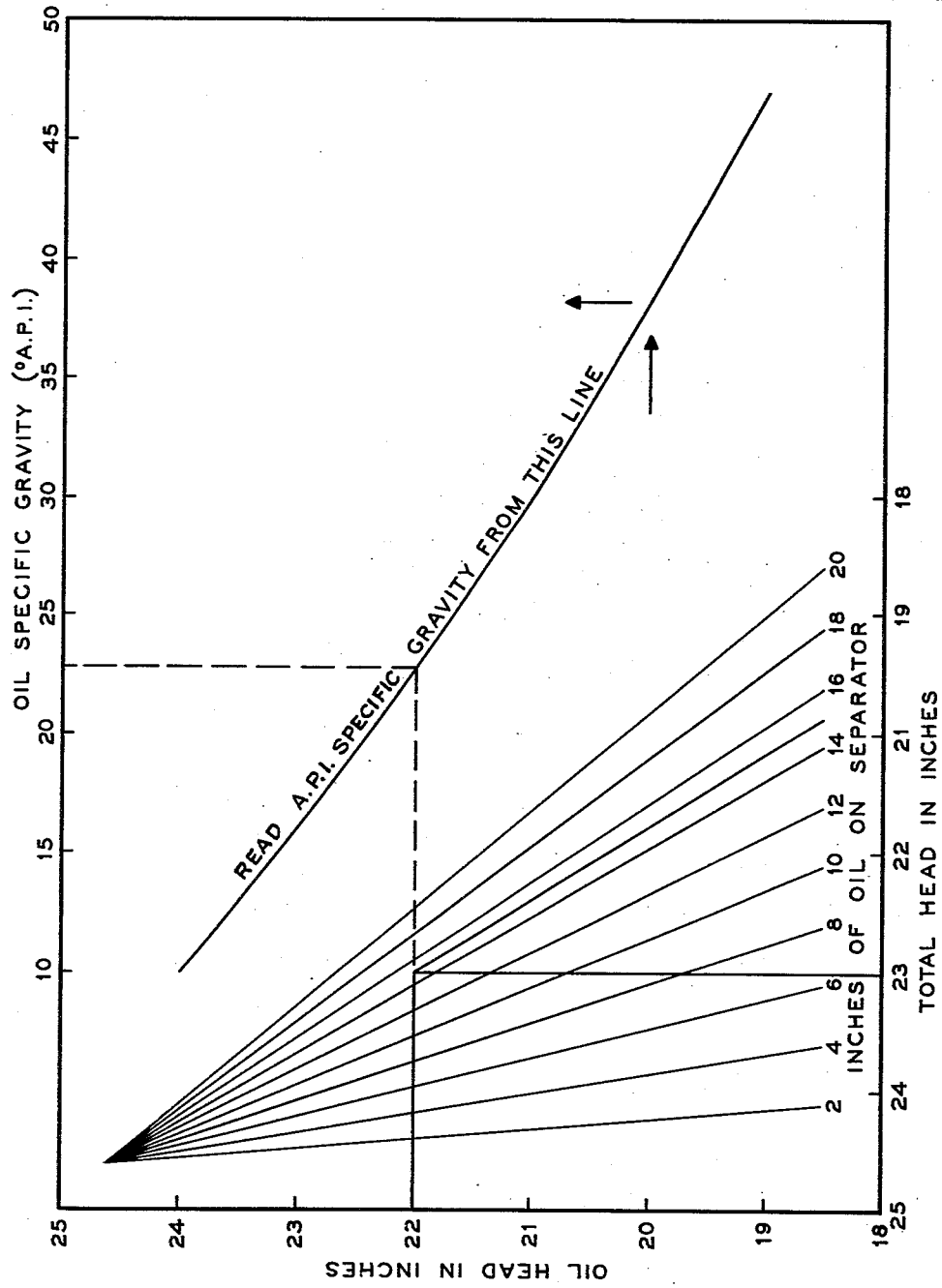
FIG. 3 is a representative chart for relating the measurements derived by the apparatus of FIG. 2 and from which may be read the depth of a fluid in the separator.

The method of the present invention may be performed by the novel apparatus as illustrated in FIG. 1 of the drawings, wherein the depth measuring probe 11 is illustrated partially submerged within an oil-water separator 12. Illustrated within the separator 12 are layers of water 13, of oil 14 and an emulsion layer 15 separating the two dissimilar fluids. The separator is provided with an inlet port 16 supplying the oil-water mixture and a pair of outlet ports 17 and 18 for discharging the separated fluids. It should be understood that the separator illustrated in FIG. 1 is merely representative of a container for separating fluid mixtures and that the actual separators in commercial use may be considerably more elaborate.

The probe is more fully illustrated in FIG. 2 wherein a support member 21 is shown as slidably supported on a rod 22. The support member 21 may be fixed in place through the provision of a locking means 23, here illustrated as a threaded lock shaft passing through the support and engaging the rod. The member 21 supports a hollow tube 24 secured thereto by suitable straps 25. Tube 24 is open at the upper end and is provided with a bottom end closing means 26 including releasable securing means 27. With this construction, tube 24 may be opened to permit drainage between measurements. A strap 28, fixed to the support member 21, is adapted to hold a pair of tubular members 29 and 31 in a secured relationship on the support 21. A fluid surface indicating plate 32 is also secured to the support member and may be adjustable along a groove 33 cut into the support. After the plate 32 has been adjusted it remains fixed for future measurements as it indicates the elevation of the column of fluids measured by tubular members 29 and 31. A reference mark or scale may be provided on support member 21 so that fluid column measurements may be determined.

The tubular members 29 and 31 are connected by flexible tubes 34 and 35, respectively, to a U-tube manometer pressure indicator 36 through a pair of valve means 37 and 38. The valves 37 and 38 connect the pressure probe to the manometer through a Y pipe joint 39 and a T pipe joint 41 at the closed end 42 of the U-tube manometer 36. The manometer includes a fluid 43 within the lower portion thereof and an open tube 44 completing the U shape. The T joint 41 also connects an air pressure source 45, shown as an aspirator bulb, through a valve 46.

The pressure probe of the present invention may also be provided with a temperature sensitive means 51 secured to the support member 21 and connected by wires 52 and 53 to a temperature indicating dial 54.

In performing the method of the present invention with the apparatus as illustrated herein, the probe 11 is inserted into the separator 12 to an initial position where the hollow tube 24 is just below the level of the first fluid or oil level 14. In this position tube 24 becomes filled with the first fluid. The probe is then adjusted to a position where the indicator 32 is at the level of the upper surface of the first fluid. The lock nut 23 may then be tightened to secure the support member 21 to the rod 22. The tube 31 now has its open end in communication with the fluid within the hollow tube 24, and the tube 29 has its open end in communication with the same elevation of the combination of the first and second fluids including any emulsion layer. In an oil-water separator as shown in FIG. 1 the layers rising from the bottom are water, the emulsion and the layer of oil.

Having positioned the probe within the separator 12, the tubular members 34 and 35 and the electrical conductors 52 and 53 are connected to the manometer unit 36. The manometer is then normalized to indicate the same level of fluid in the tubes 42 and 44. The aspirator bulb 45 is connected through the open valve 46 to the first tube 42 of the manometer and through open valve 37 to the tube 29. Valve 38 is closed so that the manometer responds to the fixed elevation of the water-oil combination. The aspirator bulb 45 is then pumped to establish a head or pressure known to be greater than that which is required to bubble air through the open end of the tube 29. The valve 46 is then closed and the manometer will level out at a response indicating the head and pressure necessary to force air through the tube 29. The manometer then indicates the total head or, in effect, the specific gravity of the combination of the water, emulsion and oil layer.

Valve 37 is then closed and valve 38 opened and the manometer is again normalized. With valve 46 open, the aspirator bulb 45 is pumped to again provide a pressure greater than that required to bubble air through the open end of tube 31. Valve 46 is then closed and the manometer is permitted to seek the level necessary to bubble air through the tube 31. Having sought the desired level the manometer now indicates the head, pressure, or specific gravity of the unknown elevation of the oil or first fluid material.

The two pressure indications derived from the manometer may now be transferred to a graph of the type shown in FIG. 3. The chart illustrated in FIG. 3 is based on 1.025 specific gravity water (sea water with slight dilution with fresh water). Different charts are used where other fluids are separated and where a water mixture of different specific gravity is encountered. In the illustrated graph the abscissa is the total head in inches as derived from the tube 29 and the first reading of the manometer while the ordinate is the oil head or pressure indicated by the tube 31 and the second reading of the manometer. The two readings provide the coordinates for a point within the graph and from that point, a straight line may be followed within the limits of the varying slopes shown on the graph to indicate the number of inches of oil or first fluid on the separator. Illustrating the use of the graph, if the total head in inches of water as determined by the first reading of the manometer indicates 23 and the oil head in inches as determined by the second reading of the manometer is 22, the two coordinates will intersect within the graph to indicate approximately 15 inches of oil on the separator.

The graph of FIG. 3 may also be employed to provide an estimate of the specific gravity of the oil floating on the water within the separator. This is accomplished by following the line of the chart ordinate to the point of intersection with the specific gravity line also illustrated in the chart. In the illustrated example the specific gravity of the oil in the separator is approximately 22.6° API.

The temperature-sensitive member 51 provides a reading at meter 54 to indicate the temperature of the fluids within the separator. The temperature information may be employed in a well-known manner to correct the observed specific gravity of the oil layer to API specific gravity at 60° F. and to correct head readings to standard conditions where necessary.

One of the advantages provided by the present invention is the resolution of an oil-water emulsion layer into the equivalent separated elevation of oil and water. It may be seen that by measuring the total head with the tube 29 and the oil head with the tube 31, the emulsion layer will contribute to the reading derived from tube 29 and may be compared to the total oil head measurement of the tube 31 as though there were a clean break between the layer of oil and water within the separator. The emulsion itself will have a specific gravity depending upon the composition of the mixture of oil and water then in the emulsion.

While a certain preferred embodiment of the invention has been specifically disclosed it is understood that the invention is not limited thereto as many variations will be readily apparent to those skilled in the art and the invention is to be given its broadest possible interpretation within the terms of the following claim.

I claim:

A method for measuring the elevation of a first liquid floating on a second liquid within a container comprising the steps of:

(a) positioning a pair of air conveying members in said container with an open end of each member a known distance below the upper surface of said first liquid and extending below the upper surface of said second liquid;

(b) isolating one of said members from said second liquid with an enclosure open at the upper end and having a closable port at the lower end;

(c) lowering said enclosure to just below the upper surface of said first fluid to permit said first fluid to flow into said enclosure;

(d) maintaining said members in a fixed position with said upper end of said enclosure just below the upper surface of said first fluid;

(e) connecting said air conveying members to an air source having controllable pressure, and connecting said members and said source to an air pressure registering means;

(f) separately forcing air through each of said members from said source and separately registering the pressure required to force said air out through the open end of said members;

(g) correlating said separately registered pressures to determine the effect on said pressures contributed by said first fluid alone and by said first and second fluid together;

(h) and converting said determined fluid pressures to elevations of said first fluid on said second fluid in said container.

References Cited in the file of this patent
UNITED STATES PATENTS

| | | |
|---|---|---|
| 1,900,775 | Star | Mar. 7, 1933 |
| 2,946,443 | Schmidt | July 26, 1960 |

FOREIGN PATENTS

| | | |
|---|---|---|
| 498,630 | Great Britain | Jan. 11, 1939 |